United States Patent
Lin et al.

(10) Patent No.: US 11,334,210 B2
(45) Date of Patent: May 17, 2022

(54) METHOD FOR WINDOW ADJUSTMENT, MOBILE TERMINAL, AND COMPUTER-READABLE STORAGE MEDIUM

(71) Applicant: GUANGDONG OPPO MOBILE TELECOMMUNICATIONS CORP., LTD., Guangdong (CN)

(72) Inventors: Zhiyong Lin, Guangdong (CN); Liangjing Fu, Guangdong (CN); Tongxi Li, Guangdong (CN); Lei Jing, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/195,179

(22) Filed: Mar. 8, 2021

(65) Prior Publication Data

US 2021/0191581 A1    Jun. 24, 2021

Related U.S. Application Data

(63) Continuation of application No. PCT/CN2019/096548, filed on Jul. 18, 2019.

(30) Foreign Application Priority Data

Sep. 14, 2018    (CN) .......................... 201811075647.5

(51) Int. Cl.
*G06F 3/0481*    (2022.01)
*G06F 3/04842*    (2022.01)
*G06F 3/0488*    (2022.01)

(52) U.S. Cl.
CPC .......... *G06F 3/0481* (2013.01); *G06F 3/0488* (2013.01); *G06F 3/04842* (2013.01);
(Continued)

(58) Field of Classification Search
CPC .. G06F 3/0481; G06F 3/04842; G06F 3/0488; G06F 2203/04104;
(Continued)

(56) References Cited

U.S. PATENT DOCUMENTS

| 10,352,975 B1* | 7/2019 | Peterson ............... G06F 3/0416 |
| 2010/0309147 A1* | 12/2010 | Fleizach ............. G06F 3/04842 345/173 |

(Continued)

FOREIGN PATENT DOCUMENTS

| CN | 103067569 A | 4/2013 |
| CN | 103412720 A | 11/2013 |

(Continued)

OTHER PUBLICATIONS

International Search Report with English Translation of International application No. PCT/CN2019/096548 dated Oct. 16, 2019 (13 pages).

(Continued)

*Primary Examiner* — John T Repsher, III
(74) *Attorney, Agent, or Firm* — Young Basile Hanlon & MacFarlane, P.C.

(57) ABSTRACT

A window adjustment method is provided and includes operations of: when an application program in a mobile terminal being displayed in the form of a free window, monitoring touch-control information on a display interface of the mobile terminal; if the monitored touch-control information is sliding information of two touch points, determining a free window corresponding to the touch-control information, and determining an angle between the sliding directions of the two touch points; and based on the angle between the sliding directions of the two touch points, zooming or moving the free window corresponding to the touch-control information.

16 Claims, 5 Drawing Sheets

(52) U.S. Cl.
CPC ............ *G06F 2203/04104* (2013.01); *G06F 2203/04806* (2013.01)

(58) Field of Classification Search
CPC ......... G06F 2203/04806; G06F 3/0485; G06F 2203/04808
See application file for complete search history.

(56) References Cited

U.S. PATENT DOCUMENTS

| | | | |
|---|---|---|---|
| 2011/0035702 A1* | 2/2011 | Williams | G06F 3/0481 715/800 |
| 2013/0222340 A1* | 8/2013 | Ito | G06F 3/0488 345/174 |
| 2013/0346865 A1 | 12/2013 | Yuan et al. | |
| 2014/0089832 A1 | 3/2014 | Kim et al. | |
| 2015/0040073 A1* | 2/2015 | Barcay | G06F 3/04883 715/850 |
| 2015/0309668 A1* | 10/2015 | Sun | G06F 3/0488 715/783 |
| 2017/0228149 A1* | 8/2017 | Tsubakihara | G06F 3/04845 |

FOREIGN PATENT DOCUMENTS

| | | |
|---|---|---|
| CN | 103955335 A | 7/2014 |
| CN | 106055201 A | 10/2016 |
| CN | 106354405 A | 1/2017 |
| CN | 109254707 A | 1/2019 |
| EP | 1942401 A1 | 7/2008 |

OTHER PUBLICATIONS

First Office Action with English Translation from China patent office in a counterpart Chinese patent Application 201811075647.5, dated Mar. 3, 2020 (17 pages).

Second Office Action with English Translation from China patent office in a counterpart Chinese patent Application 201811075647.5 dated Sep. 9, 2020 (21 pages).

Chinese Third Office Action with English Translation for CN Application 201811075647.5 dated Mar. 29, 2021. (20 pages).

Android anatomy: multi window implementation parsing in Android 7.0, Web links:"https://blog.csdn.net/weixin_34419321/article/details/89187595".

Chinese Rejection decision with English Translation for CN Application 201811075647.5 dated Jul. 5, 2021. (15 pages).

Extended European Search Report for EP Application 19860633.7 dated Oct. 26, 2021. (9 pages).

* cited by examiner

METHOD FOR WINDOW ADJUSTMENT, MOBILE TERMINAL, AND COMPUTER-READABLE STORAGE MEDIUM

CROSS-REFERENCE TO RELATED APPLICATION(S)

The present application is a continuation-application of International (PCT) Patent Application No. PCT/CN2019/096548 filed on Jul. 18, 2019, which claims priority of Chinese Patent Application No. 201811075647.5, filed on Sep. 14, 2018, the entire contents of both of which are hereby incorporated by reference.

TECHNICAL FIELD

The present disclosure relates to the field of mobile terminals, and particularly to a method for window adjustment, a mobile terminal, and a non-transitory computer-readable storage medium.

BACKGROUND

The Android operating system is an operating system which is flexible, based on Linux, and has an open source code. The Android operation system is substantially applied in mobile devices, such as smart phones and tablet computers. A display interface of a mobile device based on the Android operating system prior to the 7.0 version may display only one application interface running in the foreground each time.

SUMMARY

A first aspect of the embodiments of the present disclosure provides a method for window adjustment, including operations of: monitoring touch information on a display interface of the mobile terminal when the mobile terminal has an application displayed in a free window mode; determining a free window corresponding to the touch information and determining an angle between a sliding direction of a first contact and a sliding direction of a second contact, in response to the monitored touch information being sliding information of the first and the second contacts; and performing a zooming operation or a moving operation on the free window corresponding to the touch information based on the angle between the two sliding directions of the first and the second contacts.

A second aspect of the embodiments of the present disclosure provides a mobile terminal, comprising: a non-transitory memory, a processor, and a computer program stored in the non-transitory memory and operable on the processor. The processor is configured to execute the computer program to perform operations of: monitoring touch information on a display interface of the mobile terminal when the mobile terminal has an application displayed in a free window mode; determining a free window corresponding to the touch information and determining an angle between a sliding direction of a first contact and a sliding direction of a second contact, in response to the monitored touch information being sliding information of the first and the second contacts; and performing a zooming operation or a moving operation on the free window corresponding to the touch information based on the angle between the two sliding directions of the first and the second contacts.

A third aspect of the embodiments of the present disclosure provides a computer-readable storage medium, having stored thereon a computer program. The computer program is capable of being executed by one or more processors to perform operations of: monitoring touch information on a display interface of the mobile terminal when the mobile terminal has an application displayed in a free window mode; determining a free window corresponding to the touch information and determining an angle between a sliding direction of a first contact and a sliding direction of a second contact, in response to the monitored touch information being sliding information of the first and the second contacts; and performing a zooming operation or a moving operation on the free window corresponding to the touch information based on the angle between the two sliding directions of the first and the second contacts.

BRIEF DESCRIPTION OF DRAWINGS

In order to clearly illustrate technical solutions of the embodiments of the present disclosure or the prior art, accompanying drawings for the description of the embodiments or the prior art will be briefly introduced in the following. Apparently, the drawings in the following description may show only some embodiments of the present disclosure. According to these drawings, other drawings may be further obtained by any ordinarily skilled person in the art without making creative work.

DETAILED DESCRIPTION

Figure 1:
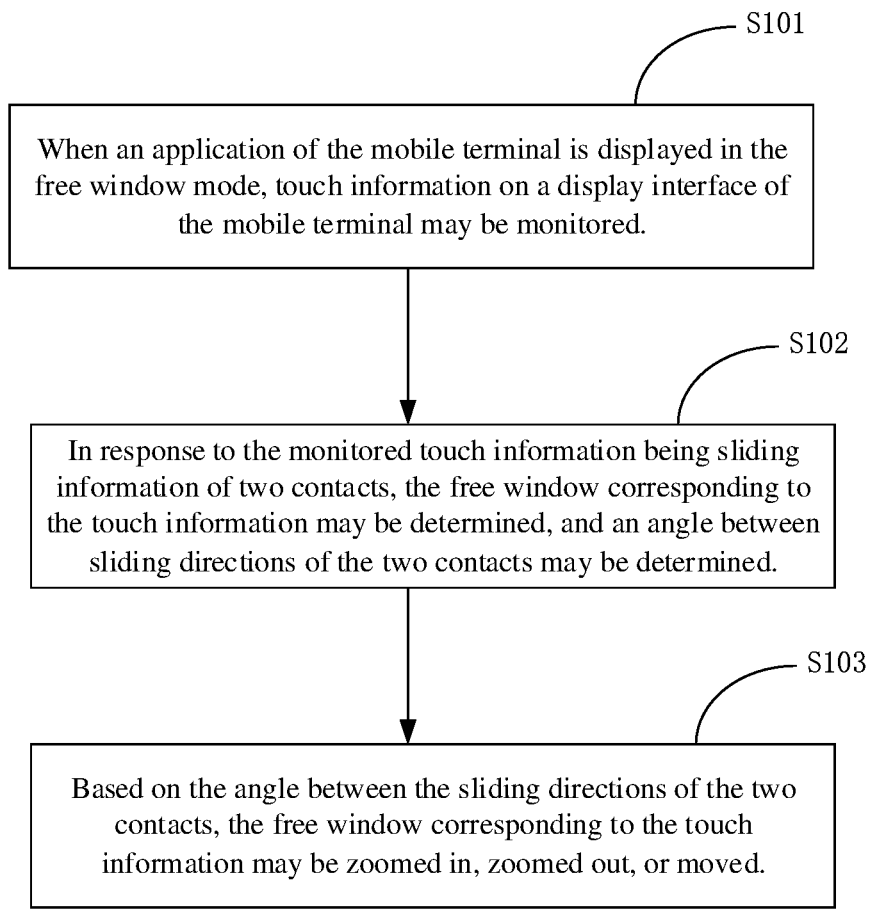
FIG. 1 is a flow chart of a method for window adjustment according to an embodiment of the present disclosure.

In the following description, for the purpose of illustration rather than limitation, specific details are provided, such as a specific system structure and technology, for a thorough understanding of the embodiments of the present disclosure. However, any ordinary skilled person in the art should be clear that, the present disclosure may also be implemented in other embodiments without the provided specific details. In other cases, details of a well-known system, apparatus, circuit and method may be omitted to avoid hindering the description of the present disclosure by unnecessary details.

It should be understood that, in the specification and appended claims, the term "comprise" indicates presence of the described feature, the described entirety, the described step, the described operation, the described element, and/or the described component, but does not exclude presence or addition of one or more other features, entireties, steps, operations, elements, components, and/or a collection thereof.

It should also be understood that, the terms used in the specification of the present disclosure are only for the purpose of describing particular embodiments and are not intended to limit the present disclosure. As used in the specification of the present disclosure and the appended claims, singular forms "a/an", "one" and "the/said" are intended to include plural forms, unless clearly indicated otherwise in the context.

It should be further understood that, the terms "and/or" used in the specification of the present disclosure and the appended claims refer to any combination and all possible combinations of one or more of the associated items listed, and include these combinations.

As used in the present specification and the appended claims, the term "if" may be interpreted as "when", "once", "in response to determining" or "in response to detecting" according to the context. Likewise, the phrase "if determining" or "if detecting (the described condition or event)" may be interpreted as meaning "once determining" or "in response to determining", or "once detecting (the described condition or event)" or "in response to detecting (the described condition or event)" according to the context.

In order to describe the technical solutions of the present disclosure, an application scenario of the present disclosure may be introduced first. A display interface of a current mobile terminal, such as a mobile phone, may usually displays an interface of an application, or display interfaces of two applications in a split-screen manner. However, when the interfaces of the two applications are displayed in the split-screen manner, zooming in the interface of one of the two applications may cause the interface of the other application to become smaller. In this way, windows of the applications may not be adjusted at will. Therefore, an embodiment of the present disclosure provides a Freeform free window which is a kind of a multi-window mode introduced by Android N. In a free window mode, it is possible to zoom in and out a window at will, to move a window at will, and the like. Of course, the multi-window mode further includes a split-screen mode and a picture-in-picture mode, in addition to the Free form mode. When the interface of the application is displayed in the Freeform window form, a size and a position of the interface (the Freeform window) of the application may be adjustable, which will be explained below through specific embodiments.

According to a first aspect, a method for window adjustment includes operations of: monitoring touch information on a display interface of the mobile terminal when the mobile terminal has an application displayed in a free window mode; determining a free window corresponding to the touch information and determining an angle between a sliding direction of a first contact and a sliding direction of a second contact, in response to the monitored touch information being sliding information of the first and the second contacts; and performing a zooming operation or a moving operation on the free window corresponding to the touch information based on the angle between the two sliding directions of the first and the second contacts.

In some embodiments, the performing a zooming operation or a moving operation on the free window corresponding to the touch information based on the angle between the two sliding directions of the first and the second contacts, includes: monitoring a change in a distance between the first and the second contacts in response to the angle between the sliding direction of the first contact and the sliding direction of the second contact being within a first preset range; performing a zooming-in operation on the free window in response to the distance between the first and the second contacts increasing, wherein zoom-in times of the free window is determined based on a value of the change in the distance between the first and the second contacts; performing a zooming-out operation on the free window in response to the distance between the first and the second contacts decreasing, wherein zoom-out times of the free window is determined based on the value of the change in the distance between the first and the second contacts.

In some embodiments, the performing a zooming operation or a moving operation on the free window corresponding to the touch information based on the angle between the two sliding directions of the first and the second contacts, further comprises: performing the moving operation on the free window in response to the angle between the sliding direction of the first contact and the sliding direction of the second contact being within a second preset range, wherein a direction of the moving operation is one of the sliding direction of the first contact and the sliding direction of the second contact.

In some embodiments, after the monitoring touch information on a display interface of the mobile terminal, the method further includes: determining the free window corresponding to the touch information and performing the zooming operation on the free window corresponding to the touch information, in response to the monitored touch information being presence of the first and the second contacts and presence of sliding information of one of the first and the second contacts.

In some embodiments, the performing the zooming operation on the free window corresponding to the touch information, in response to the monitored touch information being presence of the first and the second contacts and presence of sliding information of one of the first and the second contacts, includes: monitoring a change in a distance between the first and the second contacts in response to the monitored touch information being the presence of the first and the second contacts and the presence of sliding information of one of the first and the second contacts; performing a zooming-in operation on the free window in response to the distance between the first and the second contacts increasing, wherein zoom-in times of the free window is determined based on a value of the change in the distance between the first and the second contacts; and performing a zooming-out operation of the free window in response to the distance between the first and the second contacts decreasing, wherein zoom-out times of the free window is determined based on the value of the change in the distance between the first and the second contacts.

In some embodiments, the performing a zooming-in operation on the free window includes: performing the zooming-in on the free window, remaining the form of content displayed in the free window unchanged; or performing the zooming-in operation on the free window and the content displayed in the free window simultaneously.

In some embodiments, the determining a free window corresponding to the touch information, includes: setting a free window corresponding to an area where one of the two contacts in the touch information is located as the free window corresponding to the touch information.

In some embodiments, before the performing a zooming operation or a moving operation on the free window corresponding to the touch information, the method further includes: selecting a point from the free window, and setting the point as a reference point, wherein a position of the reference point remains unchanged relative to the display interface while the free window is being zoomed.

In some embodiments, the selecting a point from the free window, and setting the point as a reference point, includes: calculating a vertical distance from an initial position of the first contact to each border line of the free window and a vertical distance from an initial position of the second contact to each border line of the free window, obtaining a plurality of vertical distances, and determining whether a minimum vertical distance of the plurality of vertical distances is less than a preset value; determining the initial position of one of the first and the second contacts corresponding to the minimum vertical distance and a border line of the free window corresponding to the minimum vertical distance, and set a perpendicular foot from the initial position of the contact corresponding to the minimum vertical distance to the border line corresponding to the minimum vertical distance as the reference point, in response to the minimum vertical distance being less than the preset value; and setting a center point of a line connecting the initial positions of the first and the second contacts as the reference point in response to the minimum vertical distance being greater than or equal to the preset value.

In some embodiments, the method further includes: switching the application into being displayed in the free window mode in response to the application of the mobile terminal being displayed in a mode other than the free window mode and a preset triggering condition being detected.

According to a second aspect, a mobile terminal includes: a non-transitory memory, a processor, and a computer program stored in the non-transitory memory and operable on the processor. The processor is configured to execute the computer program to perform operations of: monitoring touch information on a display interface of the mobile terminal when the mobile terminal has an application displayed in a free window mode; determining a free window corresponding to the touch information and determining an angle between a sliding direction of a first contact and a sliding direction of a second contact, in response to the monitored touch information being sliding information of the first and the second contacts; and performing a zooming operation or a moving operation on the free window corresponding to the touch information based on the angle between the two sliding directions of the first and the second contacts.

In some embodiments, while performing the zooming operation or the moving operation on the free window corresponding to the touch information based on the angle between the two sliding directions of the first and the second contacts, the processor is configured to execute the computer program to further perform operations of: monitoring a change in a distance between the first and the second contacts in response to the angle between the sliding direction of the first contact and the sliding direction of the second contact being within a first preset range; performing a zooming-in operation on the free window in response to the distance between the first and the second contacts increasing, wherein zoom-in times of the free window is determined based on an amplitude of the change in the distance between the first and the second contacts; performing a zooming-out operation on the free window in response to the distance between the first and the second contacts decreasing, wherein zoom-out times of the free window is determined based on the amplitude of the change in the distance between the first and the second contacts.

In some embodiments, while performing the zooming operation or the moving operation on the free window corresponding to the touch information based on the angle between the two sliding directions of the first and the second contacts, the processor is configured to execute the computer program to further perform operations of: performing the moving operation on the free window in response to the angle between the sliding direction of the first contact and the sliding direction of the second contact being within a second preset range, wherein a direction of the moving operation is either one of the sliding direction of the first contact and the sliding direction of the second contact.

In some embodiments, after monitoring touch information on the display interface of the mobile terminal, the processor is configured to execute the computer program to further perform operations of: determining the free window corresponding to the touch information and performing the zooming operation on the free window corresponding to the touch information, in response to the monitored touch information being presence of the first and the second contacts and presence of sliding information of one of the first and the second contacts.

In some embodiments, while performing the zooming operation on the free window corresponding to the touch information, in response to the monitored touch information being presence of the first and the second contacts and presence of sliding information of one of the first and the second contacts, the processor is configured to execute the computer program to further perform operations of: monitoring a change in a distance between the first and the second contacts in response to the monitored touch information being the presence of the first and the second contacts and the presence of sliding information of one of the first and the second contacts; performing a zooming-in operation on the free window in response to the distance between the first and the second contacts increasing, wherein zoom-in times of the free window is determined based on a value of the change in the distance between the first and the second contacts; and performing a zooming-out operation of the free window in response to the distance between the first and the second contacts decreasing, wherein zoom-out times of the free window is determined based on the value of the change in the distance between the first and the second contacts.

In some embodiments, while performing the zooming-in operation on the free window, the processor is configured to execute the computer program to further perform operations of: performing the zooming-in on the free window, remaining the form of content displayed in the free window unchanged; or performing the zooming-in operation on the free window and the content displayed in the free window simultaneously.

In some embodiments, while determining the free window corresponding to the touch information, the processor is configured to execute the computer program to further perform operations of: setting a free window corresponding to an area where one of the two contacts in the touch information is located as the free window corresponding to the touch information.

In some embodiments, before performing the zooming operation or the moving operation on the free window corresponding to the touch information, the processor is configured to execute the computer program to further perform operations of: selecting a point from the free window, and setting the point as a reference point, wherein a position of the reference point remains unchanged relative to the display interface while the free window is being zoomed.

In some embodiments, while selecting the point from the free window, and setting the point as the reference point, the processor is configured to execute the computer program to further perform operations of: calculating a vertical distance from an initial position of the first contact to each border line of the free window and a vertical distance from an initial position of the second contact to each border line of the free window, obtaining a plurality of vertical distances, and determining whether a minimum vertical distance of the plurality of vertical distances is less than a preset value; determining the initial position of one of the first and the second contacts corresponding to the minimum vertical distance and a border line of the free window corresponding to the minimum vertical distance, and set a perpendicular foot from the initial position of the contact corresponding to the minimum vertical distance to the border line corresponding to the minimum vertical distance as the reference point, in response to the minimum vertical distance being less than the preset value; and setting a center point of a line connecting the initial positions of the first and the second contacts as the reference point in response to the minimum vertical distance being greater than or equal to the preset value.

According to a third aspect, a computer-readable storage medium has stored thereon a computer program. The computer program is capable of being executed by one or more processors to perform operations of: monitoring touch information on a display interface of the mobile terminal when the mobile terminal has an application displayed in a free window mode; determining a free window corresponding to the touch information and determining an angle between a sliding direction of a first contact and a sliding direction of a second contact, in response to the monitored touch information being sliding information of the first and the second contacts; and performing a zooming operation or a moving operation on the free window corresponding to the touch information based on the angle between the two sliding directions of the first and the second contacts.

FIG. 1 is a flow chart of a method for window adjustment according to an embodiment of the present disclosure. As shown in the figure, the method may include the following operations.

In an operation S101, when an application of the mobile terminal is displayed in the free window mode, touch information on a display interface of the mobile terminal may be monitored.

In the present embodiment, when the application of the mobile terminal is displayed in the Freeform window, a size, a shape, and a position of an interface of the application displayed in the Freeform window may be adjusted at will. However, when the application of the mobile terminal is not displayed in the Freeform window, the display interface of the mobile terminal may display an interface of one application, and the interface of the currently displayed application may occupy almost the entire display interface of the mobile terminal. When the application of the mobile terminal is not displayed in the Freeform window, the display interface of the mobile terminal may display interfaces of two applications, and the interfaces of the two currently displayed applications may be connected to each other; and the interfaces of the two applications may occupy almost the entire display interface of the mobile terminal.

In the embodiment of the present disclosure, a preset triggering condition may be set. In response to the preset triggering condition being triggered, the application in the mobile terminal may be switched from being displayed in other modes (modes other than the mode of being displayed in the Freeform window) to being displayed in the Freeform window. For example, a preset physical key or a combination of preset physical keys, preset gesture information, or a virtual button in a visual interface of the mobile terminal may be configured for triggering the preset triggering condition.

Touch information, such as preset gesture information, preset touch information, or the like, may be preset to adjust the Freeform window.

When the touch information on the display interface of the mobile terminal is monitored, presence of the touch information in a display area where the Freeform window is located may be monitored. For example, a plurality of Freeform windows may be displayed on the display interface of the mobile terminal, such as a Freeform window A, a Freeform window B, and a Freeform window C, and the touch information may be a double-click operation. A user performing the double-click operation in a display area corresponding to the Freeform window A may indicate that the touch information is present, and a free window corresponding to the touch information may be the Freeform window A. The user performing the double-click operation in an area (other area than the Freeform window A, Freeform window B and Freeform window C) where the Freeform windows are not displayed may indicate that the touch information is present, but does not have a corresponding Freeform window.

In an operation S102, in response to the monitored touch information being sliding information of two contacts, the free window corresponding to the touch information may be determined, and an angle between sliding directions of the two contacts may be determined.

In the present embodiment, a plurality of touch information may be set. When preset touch information includes the sliding information of the two contacts, and when the sliding information of the two contacts are monitored, it is required to determine the free window corresponding to the touch information and to determine an angle between the sliding directions of the two contacts. The free window corresponding to the touch information may be a free window corresponding to an area where a contact of the touch information is located. Determining the angle between the sliding directions of the two contacts may include following operations. A first line may be obtained by connecting an initial position of one of the contacts to a current position of the of one of the two contacts. A second line may be obtained by connecting an initial position of the other one of the contacts to a current position of the other one of the two contacts. An angle between the first line and the second line may be determined.

In an operation S103, based on the angle between the sliding directions of the two contacts, the free window corresponding to the touch information may be zoomed in, zoomed out, or moved.

In the present embodiment, two adjustment manners may be set for the sliding information of the two contacts correspondingly. One of the two adjustments may be, moving the Freeform window, and the other one of the two adjustments may be zooming the Freeform window. Therefore, it is further required to determine which of the two adjustments is to be performed on the Freeform window, based on the angle between the sliding directions of the two contacts.

According to another embodiment of the present disclosure, zooming or moving the free window corresponding to the touch information based on the angle between the sliding directions of the two contacts may include following operations.

In response to the angle between the sliding directions of the two contacts being within a first preset range, a change in a distance between the two contacts may be monitored.

In response to the distance between the two contacts increasing, a zooming in operation may be performed on the free window, and zoom-in times of the free window may be determined by a value the change in the distance between the two contacts.

In response to the distance between the two contacts decreasing, a zoom-out operation may be performed on the free window, and zoom-out times of the free window may be determined via the value of the change in the distance between the two contacts.

In response to the angle between the sliding directions of the two contacts being within a second preset range, the moving operation may be performed on the free window, and a direction of the moving may be a sliding direction of either one of the two contacts.

In the present embodiment, a sliding operation on a touch screen of the mobile terminal may be detected at a preset time interval. For example, the position of the contact may be detected at a first time point t1, a second time point t2 which is later than the first time point t1, and a third time point t3 which is later that the second time point t2. A previous sliding direction of the contact may be determined based on a position of the contact detected at the second time point t2 and a position of the contact detected at the first time point t1. A current sliding direction of the contact may be determined based on a position of the contact detected at the time point t3 and the position of the contact detected at the time point t2. Based on the current sliding direction of the contact, an operation to be made on the Freeform window may be determined based on the second sliding direction, and the Freeform window may be adjusted previously based on the first sliding direction.

In the present embodiment, the first preset range may be a range of 170° to 180°, a range of 175° to 180°, or a range of 160° to 180°, which is not limited herein. In the present embodiment, a condition for performing the zooming operation on the Freeform window may be set as the sliding directions of the two contacts being opposite directions, i.e., the angle therebetween being 180°. However, the user may hardly guarantee that sliding directions performed by two fingers are exactly opposite. Therefore, a relatively small range of values around 180° may be set as the first preset range. In fact, the opposite direction may include: two directions facing towards each other and two directions facing away from each other. In the case of the two directions facing towards each other, the distance between the two contacts becomes smaller, and in the case of the two directions facing away from each other, the distance between the two contacts becomes larger.

In the present embodiment, the distance increasing may correspond to the zooming in operation, and the distance decreasing may correspond to the zooming out operation. As the positions of the two contacts are monitored in real time, a value of a distance change between the two contacts may be obtained in real time. Zoom-in times corresponding to the value of the distance change may be preset, and based on the obtained value of the distance change, the Freeform window may be zoomed in by corresponding times. When the Freeform window is zoomed in, a form of content being displayed in the Freeform window may remain unchanged (for example, a font size may remain unchanged) Alternatively, the content displayed in the Freeform window may also be zoomed in (the font size may be changed) as the Freeform window is zoomed in. The principle of the zooming out operation may refer to the principle of the zooming in operation, which is not detailed herein.

Figure 2:
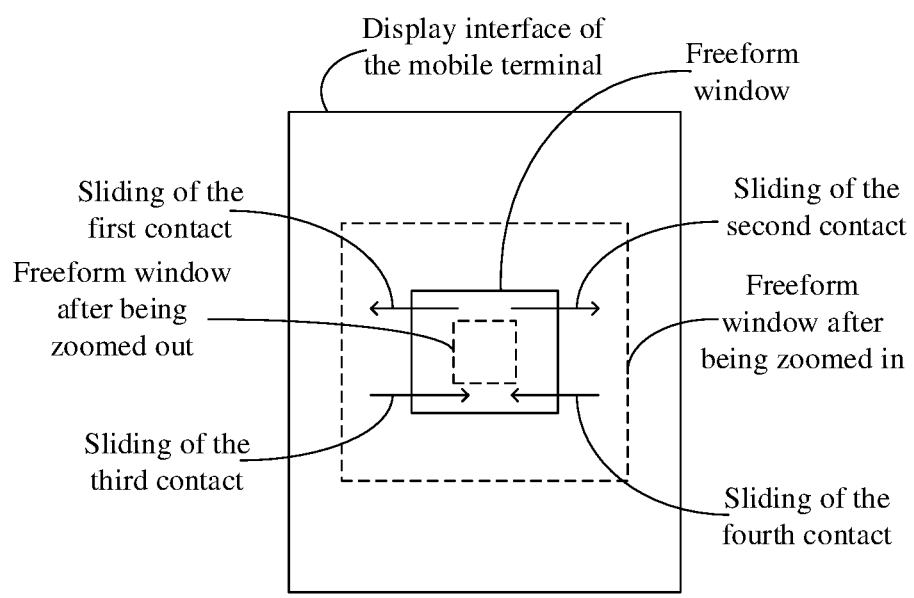
FIG. 2 is an application scenario according to an embodiment of the present disclosure.

For example, as shown in FIG. 2, an application scenario according to embodiment of the present disclosure is shown. A Freeform window may be displayed on the display interface of the mobile terminal (the corresponding window). When the user performs a two-finger sliding operation on the touch screen of the mobile terminal, the sliding operation between a first contact and a second contact may be the two contacts sliding away from each other, as shown in FIG. 2. That is, an angle between sliding directions of the first contact and the second contact may be 180°, and a distance between the first contact and the second contact may increase. In this case, the zooming in operation may be performed, and the zoomed in Freeform window is shown in FIG. 2. The sliding operation performed on a third contact and a fourth contact may be the third and the fourth contacts sliding away from each other. That is, an angle between sliding directions of the third contact and the fourth contact may be 180°, and a distance between the third contact and the fourth contact may decrease. In this case, the zooming out operation may be performed, and the zoomed out Freeform window is shown in FIG. 2.

The second preset range may be a range of 0° to 5°, a range of 0° to 10°, or a range of 0° to 13°, which is not limited herein. In the present embodiment, a condition for performing the moving operation on the Freeform window may be set as the sliding directions of the two contacts are identical, i.e., the angle therebetween may being 0°. However, the user may hardly guarantee that sliding directions of two fingers are identical. Therefore, a relatively small range of values around 0° may be set as the second preset range. A direction of the moving operation may be a sliding direction of any one of the two contacts, or a direction corresponding to an angle within the second preset range.

Figure 3:
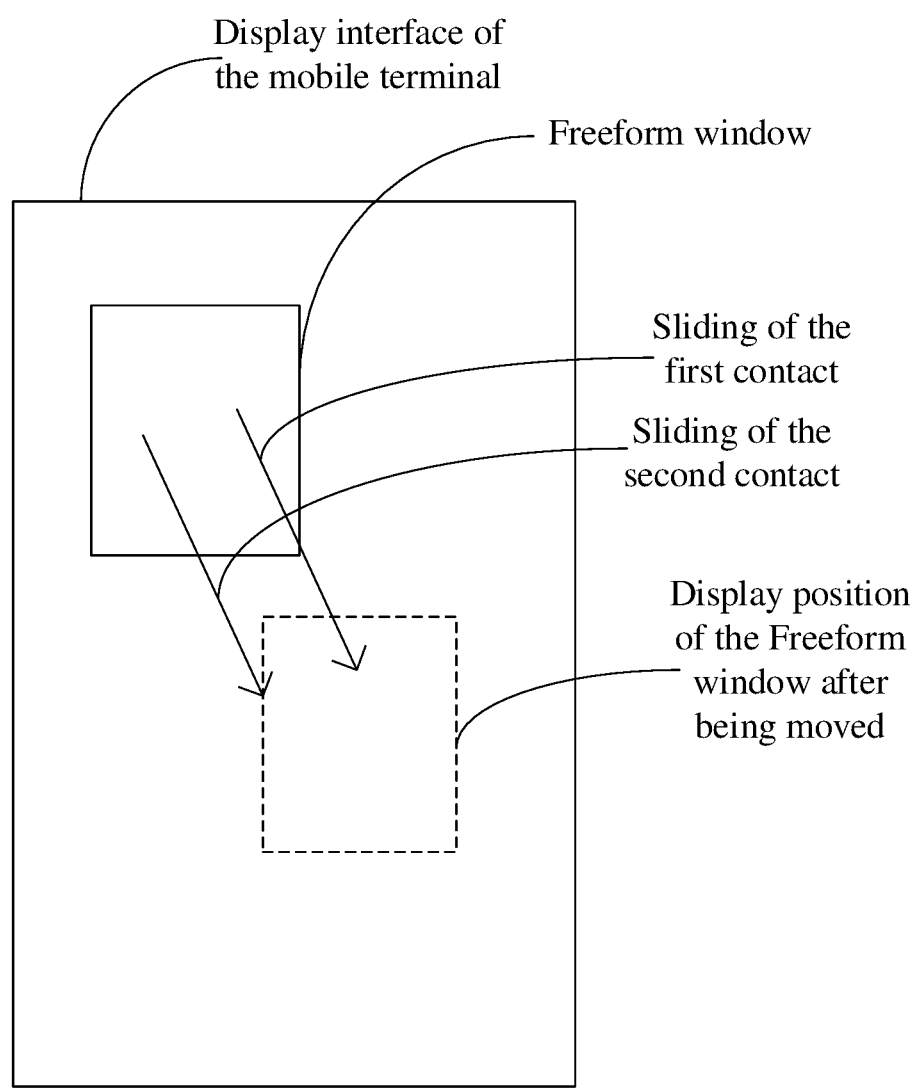
FIG. 3 is another application scenario according to an embodiment of the present disclosure.

For example, as shown in FIG. 3, an application scenario according to an embodiment of the present disclosure is shown. A Freeform window is displayed on the display interface of the mobile terminal. When the user performs a two-finger sliding operation on the touch screen of the mobile terminal, as shown in FIG. 3, two contacts slide. When an angle between sliding directions of the two contacts shown in FIG. 3 is 0°, the moving operation may be performed on the Freeform window. Dotted lines in FIG. 3 may be a position of the Freeform window after being moved. When a center point of the Freeform window before being moved is connected to a center point of the Freeform window after being moved to obtain a line, a direction corresponding to the line may be identical to the sliding directions of the two contacts. Of course, a distance of the moving of the Freeform window may be determined based on a sliding distance of the contacts.

According to another embodiment of the present disclosure, the zooming in operation performed on the free window may further include following operations.

In response to positions of any border line of the free window coinciding with any border line of the display interface of the mobile terminal, the current zooming in operation may be terminated.

According to another embodiment of the present disclosure, the moving operation performed on the free window may further include following operations.

In response to positions of any border line of the free window coinciding with any border line of the display interface of the mobile terminal, the current moving operation may be terminated.

In the present embodiment, in a process of zooming in or moving the Freeform window, a following situation may occur, that is, a position of any border line of the Freeform window may coincide with a position of any border line of the display interface of the mobile terminal. In other words, any border line of the Freeform window reaches a border of the display interface of the mobile terminal, and in this case, the current zooming in operation or the current moving operation may be terminated. Of course, after the current zooming in operation (the zooming in operation performed on the Freeform window) is terminated, the content displayed within the Freeform window may further be zoomed in (e.g., the font size may further be zoomed in).

In addition, it should be further noted that, in the art, in order to offer the user a better experience, two interfaces of two applications may be simultaneously displayed by a terminal installed with the Android 7.0 operating system. However, the two interfaces must be displayed in the split-screen manner and cannot be adjusted at will. Therefore, the manner of displaying application interfaces may not be variable and cannot be adjusted at will. Therefore, in the present embodiment, firstly, when the application of the mobile terminal is displayed in the free window mode, the touch information on the display interface of the mobile terminal may be monitored. In response to the monitored touch information being sliding information of two contacts, the free window corresponding to the touch information may be determined, and an angle between sliding directions of the two contacts may be determined. Based on the angle between the sliding directions of the two contacts, the zooming or moving operation may be performed on the free window corresponding to the touch information. Since the mobile terminal of the present disclosure may control the application to be displayed in the free window mode, when the application is displayed in the free window mode, the free window to be adjusted may be determined based on the monitored sliding information of the two contacts, and the zooming or moving operation may be performed on the free window corresponding to the touch information based on the sliding directions of the two contacts. In this way, the problem of the manner for displaying the application interfaces being invariable and unable to be adjusted at will may be solved.

Figure 4:
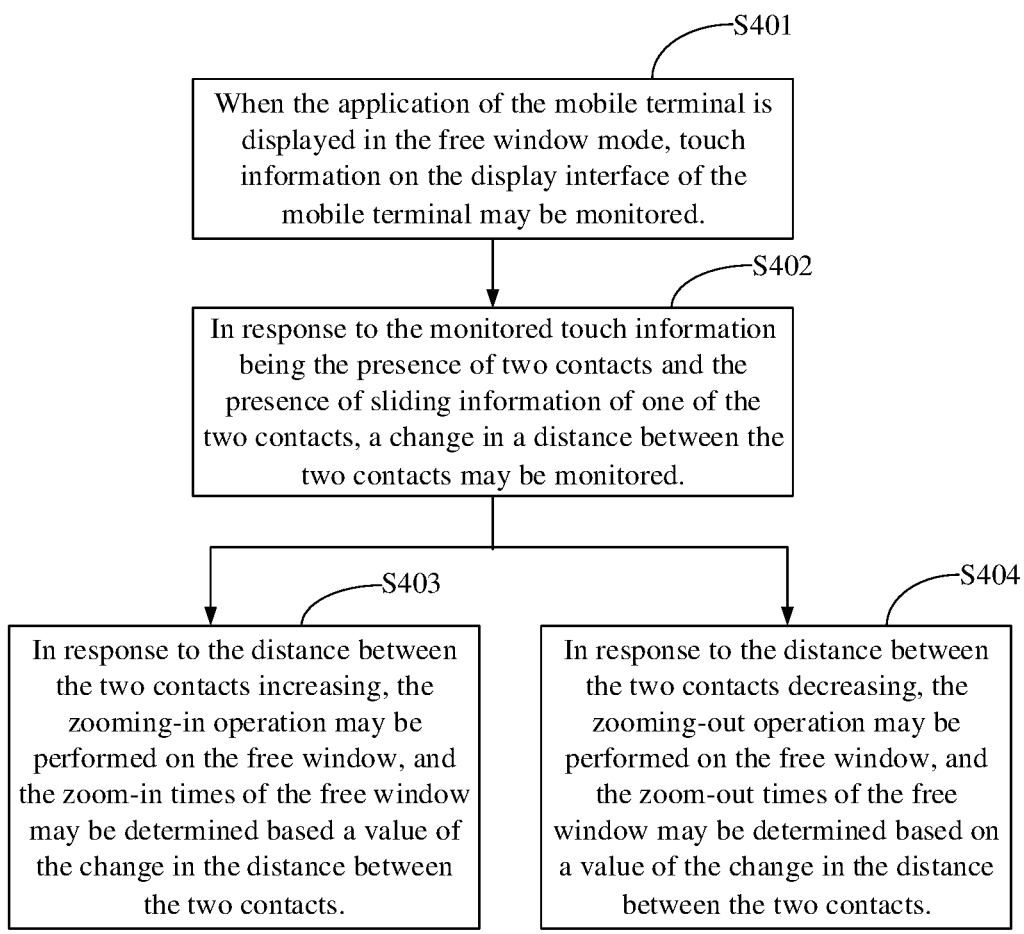
FIG. 4 is a flow chart of another method for window adjustment according to an embodiment of the present disclosure.

FIG. 4 is a flow chart of another method for window adjustment according to an embodiment of the present disclosure. As shown in FIG. 4, the embodiment of the present disclosure may include the following operations.

In an operation S401, when the application of the mobile terminal is displayed in the free window mode, touch information on the display interface of the mobile terminal may be monitored.

The detail of the operation S401 may be identical to that of the operation S101, and may refer to the description of operation S101, which is not detailed herein.

According to another embodiment of the present disclosure, in response to the monitored touch information being presence of two contacts and presence of sliding information of one of the two contacts, a free window corresponding to the touch information may be determined, and the zooming operation may be performed on the free window corresponding to the touch information.

In the embodiment of the present disclosure, a plurality of touch information may be set. In response to the preset touch information including presence of two contacts and presence of sliding information of one of the two contacts, and in response to the monitored touch information being the presence of two contacts and the presence of sliding information of one of the two contacts, the free window corresponding to the touch information may be determined, and the change in the distance between the two contacts may be determined. The Freeform window may be adjusted based on the change in the distance, and the adjustment may be the zooming operation.

In the embodiment of the present disclosure, one of the two contacts being fixed and the sliding information of the other contact being present may indicate that the distance between the two contacts becomes larger or smaller, or remains unchanged.

Therefore, according to another embodiment of the present disclosure, in response to the monitored touch information being presence of two contacts and presence of sliding information of one of the two contacts, performing the zooming operation on the free window may include performing operations S402 to S404.

In an operation S402: in response to the monitored touch information being the presence of two contacts and the presence of sliding information of one of the two contacts, a change in a distance between the two contacts may be monitored.

In an operation S403: in response to the distance between the two contacts increasing, the zooming-in operation may be performed on the free window, and the zoom-in times of the free window may be determined based a value of the change in the distance between the two contacts.

In an operation S404: in response to the distance between the two contacts decreasing, the zooming-out operation may be performed on the free window, and the zoom-out times of the free window may be determined based on a value of the change in the distance between the two contacts.

The contents of the operations S403 to step S404 may be referred to the above description, and will not be detailed herein.

In the embodiment of the present disclosure, examples will not be further illustrated for a situation of the touch information being presence of two contacts and presence of sliding information of one of the two contacts.

According to another embodiment of the present disclosure, before the zooming operation is performed on the free window corresponding to the touch information, the method further includes following operations.

A point in the free window may be selected, and the point may be set as a reference point. The reference point may be a point whose position remains unchanged relative to the display interface while the zooming operation being performed on the free window.

In the embodiment of the present disclosure, while the zooming operation is performed on the Freeform window, the reference point may be required to be determined, and the reference point may be a point of the content displayed in the Freeform window. While the Freeform window being zoomed in or zoomed out, a position of the point remains unchanged relative to the display interface of the mobile terminal. For example, coordinates of the point in the display interface of the mobile terminal before the Freeform window being zoomed may be (x1, y1), and the coordinates of the point in the display interface of the mobile terminal after the Freeform window being zoomed may still be (x1, y1).

According to another embodiment of the present disclosure, selecting the point from the free window and setting the point as the reference point may include following operations.

A vertical distance from an initial position of each of the two contacts to each border line of the free window may be calculated respectively, and it may be determined whether a minimum vertical distance is less than a preset value.

In response to the minimum vertical distance being less than the preset value, an initial position of the contact corresponding to the minimum vertical distance may be determined, and the border line of the free window corresponding to the minimum vertical distance may be determined. A perpendicular foot from the initial position of the contact to the border line may be set as the reference point.

In response to the minimum vertical distance being greater than or equal to the preset value, a center point of a line connecting two initial positions of the two contacts may be set as the reference point.

In the embodiment of the present disclosure, in response to the sliding information of the contact being present, an initial position corresponding to the sliding information may be set as the initial position of the contact. In response to the contact not sliding, the position of the contact remains unchanged, and the position of the contact may be the initial position.

A vertical distance from the initial position of the contact to each border line of the Freeform window respectively may indicate a distance between the contact and each border line. In response to the minimum vertical distance being less than the preset value, a contact being relatively close to a border line may be present. In this case, any point of the border line may be set as the reference point. That is, the position of the border line may remain unchanged. Alternatively, the initial position of the contact corresponding to the minimum vertical distance and the border line of the Freeform window corresponding to the minimum vertical distance may be determined, and the perpendicular foot from the initial position of the contact to the border line may be as the reference point. in response to the minimum vertical distance being greater than or equal to the preset value, the distance between the contact and any border line being relatively large. In this case, the center point of the line connecting the initial positions of the two contacts as the reference point, or a center point of the Freeform window may be set as the reference point.

It should be understood that, serial numbers of all the operations in the foregoing embodiments do not indicate a sequence of execution. The sequence for executing the respective procedures should be determined by the functions and internal logic, and should not limit implementation procedures of the embodiments of the present disclosure.

Figure 5:
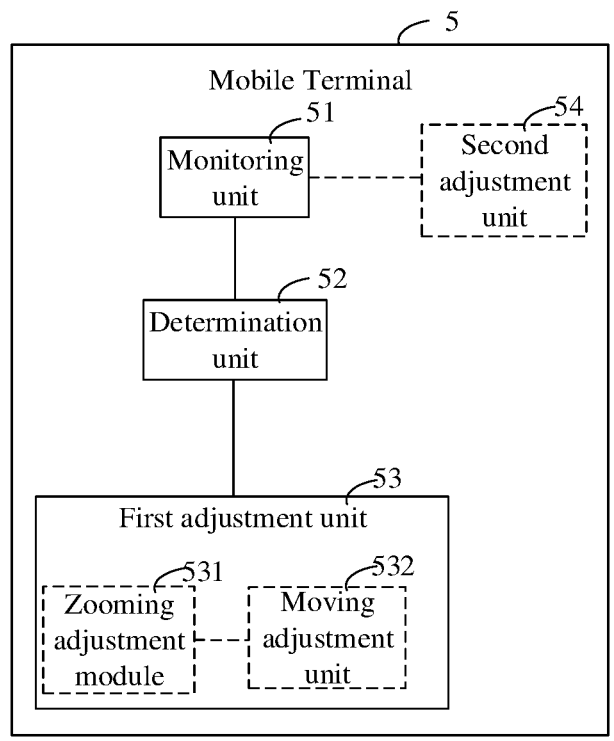
FIG. 5 is a block diagram of a mobile terminal according to an embodiment of the present disclosure.

FIG. 5 is a block diagram of a mobile terminal according to an embodiment of the present disclosure. In order to provide a concise description, only parts related to the embodiment of the present disclosure are shown.

The mobile terminal 5 may be a software unit, a hardware unit, or a combination of software and hardware units internally configured in a mobile terminal, such as, a mobile phone, a tablet computer, a laptop computer or the like. Alternatively, the unit may also be an independent widget integrated into the mobile terminal, such as, the mobile phone, tablet computer, laptop computer or the like.

The mobile terminal 5 may include following components.

A monitoring unit 51 may be configured to monitor touch information on a display interface of the mobile terminal when an application of the mobile terminal is displayed in the free window mode.

A determination unit 52 may be configured to determine a free window corresponding to the touch information and to determine an angle between sliding directions of the two contacts, in response to the monitored touch information being sliding information of the two contacts.

A first adjustment unit 53 may be configured to perform zooming or moving operation on the free window corresponding to the touch information based on the angle between the sliding directions of the two contacts.

According to another embodiment of the present disclosure, the mobile terminal may further include following components.

A mode switching unit may be configured to switch the application into being displayed in the Freeform window mode, in response to the application of the mobile terminal being displayed in a mode other than the Freeform window mode and a preset triggering condition being detected.

According to another embodiment of the present disclosure, the first adjustment unit 53 may include following modules.

A zooming adjustment module 531 may be configured to: monitor a change in a distance between the two contacts in response to the angle between sliding directions of the two contacts being within a first preset range.

The zooming adjustment module 531 may be configured to perform zooming-in operation on the free window in response to the distance between the two contacts increasing, and zooming-in times of the free window may be determined based on a value of the change in the distance between the two contacts.

The zooming adjustment module 531 may be configured to perform zooming-out operation on the free window in response to the distance between the two contacts decreasing, and zooming-out times of the free window may be determined based on a value of the change in the distance between the two contacts.

A moving adjustment module 532 may be configured to perform a moving operation on the free window in response to the angle between the sliding directions of the two contacts being within a second preset range, and a direction of the moving operation may be a sliding direction of either one of the two contacts.

According to another embodiment of the present disclosure, while performing the zooming-in operation on the free window, the zooming adjustment module 531 may further be configured to perform following operations.

The free window may be zoomed in, whereas a form of content displayed in the free window may remain unchanged. Alternatively, the free window and the content displayed in the free window may be zoomed in simultaneously.

According to another embodiment of the present disclosure, the mobile terminal 5 may further include following components.

A second adjustment unit 54 may be configured to determine a free window corresponding to the touch information and to perform the zooming operation on the free window corresponding to the touch information, in response to the touch information on the display interface of the mobile terminal being detected, and in response to the monitored touch information being presence of the two contacts and presence of sliding information of one of the two contacts.

According to another embodiment of the present disclosure, the second adjustment unit 54 may further be configured to perform following operations.

A change in a distance between the two contacts may be monitored in response to the monitored touch information being the presence of the two contacts and the presence of sliding information of one of the two contacts.

The zooming-in operation may be performed on the free window in response to the distance between the two contacts increasing, and zooming-in times of the free window may be determined based on a value of the change in the distance between the two contacts.

The zooming-out operation may be performed on the free window in response to the distance between the two contacts decreasing, and the zooming-out times of the free window may be determined based on a value of the change in the distance between the two contacts.

According to another embodiment of the present disclosure, while performing the zooming-in operation on the free window, the second adjustment unit 54 may specifically be configured to perform following operations.

The free window may be zoomed in, whereas the form of content displayed in the free window may remain unchanged. Alternatively, the free window and the content displayed in the free window may be zoomed in simultaneously.

According to another embodiment of the present disclosure, the determination unit 52 may further be configured to set a free window corresponding to an area where the contact of the touch information is located as the free window corresponding to the touch information.

The second adjustment unit 54 may further be configured to: set the free window corresponding to the area where the contact in the touch information is located as the free window corresponding to the touch information.

According to another embodiment of the present disclosure, the zooming adjustment module 531 may further be configured to perform following operations.

A point in the free window may be selected, and set the point as a reference point. The reference point may be a point whose position remains unchanged relative to the display interface while the free window is zoomed.

The zooming adjustment module 531 may further be configured to perform following operations.

A vertical distance from an initial position of each of the two contacts to each border line of the free window may be calculated respectively, and it may be determined determine whether a minimum vertical distance is less than a preset value.

An initial position of a contact corresponding to the minimum vertical distance may be obtained, a border line of the free window corresponding to the minimum vertical distance may be obtained, and a perpendicular foot from the initial position of the contact to the border line may be set as the reference point, in response to the minimum vertical distance being less than the preset value.

A center point of a line connecting the initial positions of the two contacts may be set as a reference point, in response to the minimum vertical distance being greater than or equal to the preset value.

Those skilled in the art may clearly understand that, in order to provide a concise description, division of the above-mentioned functional units and modules is only exemplified for illustration. Practically, the above-mentioned functions may be allocated to be accomplished by different functional units and modules based on demands, that is, the internal structure of the mobile terminal may be divided into different functional units or modules to complete all or part of the functions described in the above. The respective functional units and modules in the embodiments may be integrated into one processing unit, or each unit may exist alone physically, or two or more units may be integrated into one unit. The above-mentioned integrated unit may be implemented in the form of hardware or in the form of a software functional unit. In addition, specific names of the respective functional units and modules are determined for distinguishing, and are not employed to limit the scope of the present disclosure. For specific operating procedures of the afore-mentioned units and modules in the mobile terminal, reference may be made to the corresponding procedures in the foregoing method embodiments, which is not detailed herein.

Figure 6:
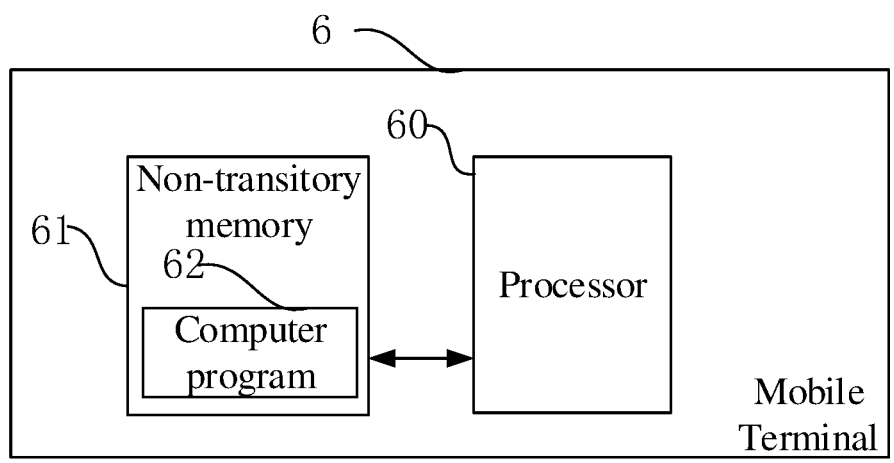
FIG. 6 is a block diagram of another mobile terminal according to an embodiment of the present disclosure.

FIG. 6 is a block diagram of a mobile terminal according to another embodiment of the present disclosure. As shown in FIG. 6, the mobile terminal 6 according to the embodiment may include one or more processors 60, a non-transitory memory 61, and a computer program 62 stored in the non-transitory memory 61 and operable on the one or more processors 60. The one or more processors 60, when executing the computer program 62, may implement the operations in the foregoing method embodiments for window adjustment, such as operations S101 to S103 shown in FIG. 1. Alternatively, the one or more processors 60, when executing the computer program 62, may implement the functions of the respective modules/units in the foregoing mobile terminal embodiments, such as the functions of the modules 51 to 53 shown in FIG. 5.

For example, the computer program 62 may be divided into one or more modules/units which are stored in the non-transitory memory 61 and executed by the one or more processors 60 to accomplish the present disclosure. The one or more modules/units may be a series of computer program instruction segments capable of completing particular functions and configured to describe execution procedures of the computer program 62 in the mobile terminal 6. For example, the computer program 62 may be divided into a monitoring unit, a determination unit, and a first adjustment unit.

The monitoring unit may be configured to monitor touch information on a display interface of the mobile terminal when an application of the mobile terminal is displayed in the free window mode.

The determination unit may be configured to determine a free window corresponding to the touch information and to determine an angle between sliding directions of two contacts, in response to the monitored touch information being sliding information of the two contacts.

The first adjustment unit may be configured to perform the zooming or moving operation on the free window corresponding to the touch information based on the angle between the sliding directions of the two contacts.

For other units or modules, reference may be made to the description in the embodiment shown in FIG. 5, which is not detailed herein.

The mobile terminal includes, but is not limited to, the one or more processors 60 and the non-transitory memory 61. Those skilled in the art may understand that, FIG. 6 is only an example of the mobile terminal 6 and does not limit the mobile terminal 6. The mobile terminal may include more or less components than those shown in FIG. 6, or have certain components combined, or different components. For example, the mobile terminal may further include an input apparatus, an output apparatus, a network access apparatus, a bus line, and the like.

The one or more processors 60 may be a central processing unit (CPU), and may also be other general-purpose processors, a digital signal processor (DSP), an application specific integrated circuit (ASIC), a field-programmable gate array (FPGA) or other programmable logic components, a discrete gate or transistor logic component, a discrete hardware assembly, or the like. The general-purpose processor may be a microprocessor or any conventional processor or the like.

The non-transitory memory 61 may be an internal storage unit of the mobile terminal 6, such as a hard disk or memory of the mobile terminal 6. The non-transitory memory 61 may also be an external storage apparatus of the mobile terminal 6, such as, a plug-in hard drive, a smart media card (SMC), or a secure digital (SD) card, a flash card or the like. Further, the non-transitory memory 61 may also include both an internal storage unit of the mobile terminal 6 and an external storage component. The non-transitory memory 61 may be configured to store the computer program and other programs and data required by the mobile terminal. The non-transitory memory 61 may further be configured to temporarily store data that has been output or will be output.

In the foregoing embodiments, the descriptions of the respective embodiments have their own emphases. For parts that are not detailed or recited in an embodiment, reference may be made to related descriptions of other embodiments.

Any ordinarily skilled person in the art may realize that, units and algorithm operations of the respective examples described in combination with the embodiments disclosed in the present disclosure may be implemented by electronic hardware, or a combination of computer software and electronic hardware. Executing these functions by hardware or software may be determined depending on particular applications of the technical solution and design constraints of the technical solution. Professional technicians may use different methods for each particular application to implement the described functions, but such implementation should not be considered as going beyond the scope of the present disclosure.

In the embodiments provided by the present disclosure, it should be understood that, the disclosed mobile terminal and method may be implemented in other manners. For example, the mobile terminal embodiments described above are only illustrative. For example, the division of the modules or units is only a logical function division. In actual implementation, other division manners may be possible. For example, a plurality of units or components may be combined or integrated into another system, or some features can be omitted or may not be implemented. In addition, the displayed or discussed mutual coupling, direct coupling or communication connection may be indirect coupling or communication connection through some interfaces, means or units, and may be in electrical, mechanical or other forms.

The units described as separate components may or may not be physically separated, and the components displayed as units may or may not be physical units. That is, they may be located in one place, or may also be distributed on a plurality of network units. Some or all of the units may be selected as actually required to achieve the purposes of the solutions of the embodiments.

Furthermore, the respective functional units in various embodiments of the present disclosure may be integrated into one processing unit, or each unit may exist alone physically, or two or more units may be integrated into one unit. The above-mentioned integrated unit can be realized in the form of hardware or in the form of a software functional unit.

If the integrated module/unit is implemented in the form of a software functional unit and sold or used as an independent product, it can be stored in a computer-readable storage medium. Based on such understanding, the present disclosure implements all or part of the flow in the above-mentioned embodiments and methods, and can also be accomplished by instructing relevant hardware through a computer program. The computer program can be stored in a computer-readable storage medium. The computer program, when executed by the processor, may implement the steps of the foregoing method embodiments. Therein, the computer program includes computer program codes which may be in the form of source codes, object codes, executable files, or some intermediate forms. The computer-readable medium may include: any entity or device capable of carrying the computer program codes, recording medium, U disk, mobile hard disk, magnetic disk, optical disk, computer memory, read-only memory (ROM), Random Access Memory (RAM), electrical carrier signal, telecommunications signal, software distribution medium, and the like. It should be noted that, the content contained in the computer-readable medium can be appropriately added or deleted according to requirements of the legislation and patent practice in the jurisdiction. For example, according to the legislation and patent practice in some jurisdictions, the computer-readable medium does not include electrical carrier signals and telecommunication signals.

The foregoing embodiments are only used to illustrate the technical solutions of the present disclosure, not to limit them. Although the present disclosure has been described in detail with reference to the foregoing embodiments, persons ordinarily skilled in the art should understand that, they may still modify the technical solutions recited in the foregoing embodiments, or make equivalent replacements of some of the technical features thereof. Such modifications or replacements do not cause the essence of the corresponding technical solutions to deviate from the spirit and scope of the technical solutions of the respective embodiments of the present disclosure, and shall be included within the scope of protection of the present disclosure.

What is claimed is:

1. A method for window adjustment, applied in a mobile terminal, the method comprising:
monitoring touch information on a display interface of the mobile terminal when the mobile terminal has an application displayed in a free window in a Freeform mode, wherein, in the Freeform mode, two interfaces of two applications are simultaneously displayed on a display screen of the mobile terminal;
determining a free window corresponding to the touch information and determining an angle between a sliding direction of a first contact and a sliding direction of a second contact, in response to the touch information being sliding information of the first contact and sliding information of the second contact; and
performing a zooming operation or a moving operation on the free window corresponding to the touch information based on the angle between the sliding direction of the first contact and the sliding direction of the second contact,
wherein before performing the zooming operation or the moving operation on the free window corresponding to the touch information, the method further comprises:
selecting a point from the free window, and setting the point as a reference point, wherein a position of the reference point remains unchanged relative to the display interface while the free window is being zoomed,
wherein selecting the point from the free window, and setting the point as the reference point comprises:
calculating a distance from an initial position of the first contact to each border line of the free window and a distance from an initial position of the second contact to each border line of the free window, obtaining a plurality of distances, and determining whether a minimum distance of the plurality of distances is less than a preset value;
determining an initial position that corresponds to the minimum distance, wherein the determined initial position is one of the initial position of the first contact or the initial position of the second contact;

determining a border line of the free window that corresponds to the minimum distance;

setting a perpendicular foot as the reference point, in response to the minimum distance being less than the preset value, wherein the perpendicular foot is set using the determined initial position and the determined border line; and setting a center point of a line connecting the initial position of the first contact and the initial position of the second contact as the reference point in response to the minimum distance being greater than or equal to the preset value.

2. The method according to claim 1, wherein the performing a zooming operation or a moving operation on the free window corresponding to the touch information based on the angle between the sliding direction of the first contact and the sliding direction of the second contact, comprises:

monitoring a change in a distance between the first contact and the second contact in response to the angle between the sliding direction of the first contact and the sliding direction of the second contact being within a first preset range;

performing a zooming-in operation on the free window in response to the distance between the first contact and the second contact increasing, wherein zoom-in times of the free window is determined based on a value of the change in the distance between the first contact and the second contact; and performing a zooming-out operation on the free window in response to the distance between the first contact and the second contact decreasing, wherein zoom-out times of the free window is determined based on the value of the change in the distance between the first contact and the second contact.

3. The method according to claim 2, wherein the performing a zooming operation or a moving operation on the free window corresponding to the touch information based on the angle between the sliding direction of the first contact and the sliding direction of the second contact, further comprises:

performing the moving operation on the free window in response to the angle between the sliding direction of the first contact and the sliding direction of the second contact being within a second preset range, wherein a direction of the moving operation is one of the sliding direction of the first contact and the sliding direction of the second contact.

4. The method according to claim 1, wherein the method further comprises:

after the monitoring touch information on a display interface of the mobile terminal, determining the free window corresponding to the touch information and performing the zooming operation on the free window corresponding to the touch information, in response to the touch information being presence of the first contact and the second contact and presence of one of the sliding information of the first contact and the sliding information of the second contact.

5. The method according to claim 4, wherein the performing the zooming operation on the free window corresponding to the touch information, in response to the touch information being presence of the first contact and the second contact and presence of one of the sliding information of the first contact and the sliding information of the second contact, comprises:

monitoring a change in a distance between the first contact and the second contact in response to the touch information being the presence of the first contact and the second contact and the presence of sliding information of one of the first contact and the second contact;

performing a zooming-in operation on the free window in response to the distance between the first contact and the second contact increasing, wherein zoom-in times of the free window is determined based on a value of the change in the distance between the first contact and the second contact; and performing a zooming-out operation of the free window in response to the distance between the first contact and the second contact decreasing, wherein zoom-out times of the free window is determined based on the value of the change in the distance between the first contact and the second contact.

6. The method according to claim 2, wherein the performing a zooming-in operation on the free window comprises:

performing the zooming-in on the free window, remaining a form of content displayed in the free window unchanged; or performing the zooming-in operation on the free window and the content displayed in the free window simultaneously.

7. The method according to claim 1, wherein the determining a free window corresponding to the touch information, comprises:

setting a free window corresponding to an area where one of the first contact or the second contact is located as the free window corresponding to the touch information.

8. The method according to claim 1, wherein the method further comprises:

switching the application into being displayed in the free window mode in response to the application of the mobile terminal being displayed in a mode other than the free window mode and a preset triggering condition being detected.

9. A mobile terminal, comprising a non-transitory memory, a processor, and a computer program stored in the non-transitory memory and operable on the processor, wherein the processor is configured to execute the computer program to perform operations of:

monitoring touch information on a display interface of the mobile terminal when the mobile terminal has an application displayed in a free window in a Freeform mode, wherein, in the Freeform mode, two interfaces of two applications are simultaneously displayed on a display screen of the mobile terminal;

determining a free window corresponding to the touch information and determining an angle between a sliding direction of a first contact and a sliding direction of a second contact, in response to the touch information being sliding information of the first contact and sliding information of the second contact; and performing a zooming operation or a moving operation on the free window corresponding to the touch information based on the angle between the sliding direction of the first contact and the sliding direction of the second contact, wherein before performing the zooming operation or the moving operation on the free window corresponding to the touch information, the method further comprises:
  selecting a point from the free window, and setting the point as a reference point, wherein a position of the reference point remains unchanged relative to the display interface while the free window is being zoomed,
  wherein selecting the point from the free window, and setting the point as the reference point comprises:
    calculating a distance from an initial position of the first contact to each border line of the free window and a distance from an initial position of the second contact to each border line of the free window, obtaining a plurality of distances, and determining whether a minimum distance of the plurality of distances is less than a preset value;
    determining an initial position that corresponds to the minimum distance, wherein the determined initial position is one of the initial position of the first contact or the initial position of the second contact;
    determining a border line of the free window that corresponds to the minimum distance;
    setting a perpendicular foot as the reference point, in response to the minimum distance being less than the preset value, wherein the perpendicular foot is set using the determined initial position and the determined border line; and
    setting a center point of a line connecting the initial position of the first contact and the initial position of the second contact as the reference point in response to the minimum distance being greater than or equal to the preset value.

10. The mobile terminal according to claim 9, wherein while performing the zooming operation or the moving operation on the free window corresponding to the touch information based on the angle between the sliding direction of the first contact and the sliding direction of the second contact, the processor is configured to execute the computer program to further perform operations of:
  monitoring a change in a distance between the first contact and the second contact in response to the angle between the sliding direction of the first contact and the sliding direction of the second contact being within a first preset range;
  performing a zooming-in operation on the free window in response to the distance between the first contact and the second contact increasing, wherein zoom-in times of the free window is determined based on an amplitude of the change in the distance between the first contact and the second contact; and
  performing a zooming-out operation on the free window in response to the distance between the first contact and the second contact decreasing, wherein zoom-out times of the free window is determined based on the amplitude of the change in the distance between the first contact and the second contact.

11. The mobile terminal according to claim 10, wherein while performing the zooming operation or the moving operation on the free window corresponding to the touch information based on the angle between the sliding direction of the first contact and the sliding direction of the second contact, the processor is configured to execute the computer program to further perform operations of:
  performing the moving operation on the free window in response to the angle between the sliding direction of the first contact and the sliding direction of the second contact being within a second preset range, wherein a direction of the moving operation is either one of the sliding direction of the first contact and the sliding direction of the second contact.

12. The mobile terminal according to claim 9, wherein after monitoring touch information on the display interface of the mobile terminal, the processor is configured to execute the computer program to further perform operations of:
  determining the free window corresponding to the touch information and performing the zooming operation on the free window corresponding to the touch information, in response to the touch information being presence of the first contact and the second contact and presence of one of the sliding information of the first contact and the sliding information of the second contact.

13. The mobile terminal according to claim 11, wherein while performing the zooming operation on the free window corresponding to the touch information, in response to the touch information being presence of the first contact and the second contact and presence of one of the sliding information of the first contact and the sliding information of the second contact, the processor is configured to execute the computer program to further perform operations of:
  monitoring a change in a distance between the first contact and the second contact in response to the touch information being the presence of the first contact and the second contact and the presence of one of the sliding information of the first contact and the sliding information of the second contact;
  performing a zooming-in operation on the free window in response to the distance between the first contact and the second contact increasing, wherein zoom-in times of the free window is determined based on a value of the change in the distance between the first contact and the second contact; and
  performing a zooming-out operation of the free window in response to the distance between the first contact and the second contact decreasing, wherein zoom-out times of the free window is determined based on the value of the change in the distance between the first contact and the second contact.

14. The mobile terminal according to claim 10, wherein while performing the zooming-in operation on the free window, the processor is configured to execute the computer program to further perform operations of:
  performing the zooming-in on the free window, remaining a form of content displayed in the free window unchanged; or
  performing the zooming-in operation on the free window and the content displayed in the free window simultaneously.

15. The mobile terminal according to claim 9, wherein while determining the free window corresponding to the touch information, the processor is configured to execute the computer program to further perform operations of:
  setting a free window corresponding to an area where one of the first contact or the second contact is located as the free window corresponding to the touch information.

16. A non-transitory computer-readable storage medium, having a computer program stored, wherein the computer program is capable of being executed by one or more processors to perform operations of:

monitoring touch information on a display interface of a mobile terminal when the mobile terminal has an application displayed in a free window in a Freeform mode, wherein, in the Freeform mode, two interfaces of two applications are simultaneously displayed on a display screen of the mobile terminal;

determining a free window corresponding to the touch information and determining an angle between a sliding direction of a first contact and a sliding direction of a second contact, in response to the touch information being sliding information of the first contact and sliding information of the second contact; and performing a zooming operation or a moving operation on the free window corresponding to the touch information based on the angle between the sliding direction of the first contact and the sliding direction of the second contact, wherein before performing the zooming operation or the moving operation on the free window corresponding to the touch information, the method further comprises:

selecting a point from the free window, and setting the point as a reference point, wherein a position of the reference point remains unchanged relative to the display interface while the free window is being zoomed, wherein selecting the point from the free window, and setting the point as the reference point comprises:

calculating a distance from an initial position of the first contact to each border line of the free window and a distance from an initial position of the second contact to each border line of the free window, obtaining a plurality of distances, and determining whether a minimum distance of the plurality of distances is less than a preset value;

determining an initial position that corresponds to the minimum distance, wherein the determined initial position is one of the initial position of the first contact or the initial position of the second contact;

determining a border line of the free window that corresponds to the minimum distance;

setting a perpendicular foot as the reference point, in response to the minimum distance being less than the preset value, wherein the perpendicular foot is set using the determined initial position and the determined border line; and setting a center point of a line connecting the initial position of the first contact and the initial position of the second contact as the reference point in response to the minimum distance being greater than or equal to the preset value.

\* \* \* \* \*